US011086489B2

(12) United States Patent
Shinohara

(10) Patent No.: US 11,086,489 B2
(45) Date of Patent: Aug. 10, 2021

(54) INFORMATION PROCESSING DEVICE AND INFORMATION PROCESSING METHOD FOR MOVING OR ADVANCING A DISPLAY REGION

(71) Applicant: SONY COMPUTER ENTERTAINMENT INC., Tokyo (JP)

(72) Inventor: Takayuki Shinohara, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 697 days.

(21) Appl. No.: 14/420,952

(22) PCT Filed: Sep. 18, 2012

(86) PCT No.: PCT/JP2012/005939
§ 371 (c)(1),
(2) Date: Feb. 11, 2015

(87) PCT Pub. No.: WO2014/045314
PCT Pub. Date: Mar. 27, 2014

(65) Prior Publication Data
US 2015/0317051 A1 Nov. 5, 2015

(51) Int. Cl.
G06F 3/0483 (2013.01)
G06F 3/0488 (2013.01)
(Continued)

(52) U.S. Cl.
CPC .......... G06F 3/0483 (2013.01); G06F 3/0485 (2013.01); G06F 3/0488 (2013.01); G06F 3/04883 (2013.01); G06F 40/114 (2020.01)

(58) Field of Classification Search
USPC ....................................................... 715/251
See application file for complete search history.

(56) References Cited

U.S. PATENT DOCUMENTS 7,376,582 B2 * 5/2008 Seet ..................... G06F 3/0483
705/14.73
7,558,820 B2 7/2009 Kimoto et al.
(Continued)

FOREIGN PATENT DOCUMENTS

JP 8-314422 11/1996
JP H09-505174 5/1997
(Continued)

OTHER PUBLICATIONS

Microsoft Computer Dictionary, 2002, Microsoft Press, 5th edition, p. 467 (Year: 2002).*
(Continued)

Primary Examiner — Maikhanh Nguyen
(74) Attorney, Agent, or Firm — Katten Muchin Rosenman LLP

(57) ABSTRACT

When a user fast-forwards pages and there arises a necessity to display pages ahead of image data generating processing by a page image generating unit 114, a paging managing unit 112 of a viewing screen control section 110 culls pages whose image data is to be generated, and requests an image rendering unit 122 to display already generated preceding or succeeding pages as a dummy. A display region managing unit 116 requests the image rendering unit 122 to sequentially display specified display regions stored in a movement rule storage unit 118 according to advancing operation of the user. The advancing operation is started at a point in time that a finger in contact with a front touch pad 21 is removed. An advance notice operation of moving a display region by a minute amount in a direction in which a movement is intended to be performed is performed before the advancing operation.

9 Claims, 9 Drawing Sheets

(51) Int. Cl.
*G06F 3/0485* (2013.01)
*G06F 40/114* (2020.01)

(56) References Cited

U.S. PATENT DOCUMENTS

| | | | | |
|---|---|---|---|---|
| 2008/0059571 A1* | 3/2008 | Khoo | G06Q 30/02 | 709/203 |
| 2009/0267909 A1* | 10/2009 | Chen | G06F 3/04883 | 345/173 |
| 2010/0295805 A1* | 11/2010 | Shin | G06F 3/04883 | 345/173 |
| 2010/0328224 A1* | 12/2010 | Kerr | G06F 3/04883 | 345/173 |
| 2012/0124505 A1* | 5/2012 | St. Jacques, Jr. | G06F 3/0483 | 715/776 |
| 2012/0311438 A1* | 12/2012 | Cranfill | G06F 17/30011 | 715/256 |
| 2013/0021281 A1* | 1/2013 | Tse | G06F 3/0425 | 345/173 |
| 2013/0055140 A1* | 2/2013 | Mosquera | G06F 3/0483 | 715/776 |

FOREIGN PATENT DOCUMENTS

| | | |
|---|---|---|
| JP | 11-177911 A | 7/1999 |
| JP | 2006-211485 | 8/2006 |
| JP | 2006-214980 | 8/2006 |
| JP | 2007-509429 | 4/2007 |
| JP | 2009-223875 | 10/2009 |
| JP | 2010-181945 A | 8/2010 |
| JP | 2012-064092 | 3/2012 |
| JP | 2012-168620 | 9/2012 |
| WO | 1996000417 A1 | 1/1996 |
| WO | 2005045588 A2 | 5/2005 |

OTHER PUBLICATIONS

Merriam Webster, Definition of Skip, 2019, Merriam-Webster, https://www.merriam-webster.com/dictionary/skip?src=search-dict-hed, p. 1 (Year: 2019).*

International Search Report dated Nov. 13, 2012 from corresponding Application No. PCT/JP2012/005939, pp. 1-6.

International Preliminary Report on Patentability and Written Opinion of the International Searching Authority dated Apr. 2, 2015 from corresponding Application No. PCT/JP2012/005939, pp. 1-17.

Japanese Notification of Reasons for Refusal dated Jul. 7, 2015 from corresponding Application No. 2014-536408, pp. 1-9.

Notification of Reasons for Refusal dated Nov. 29, 2016, from the corresponding Japanese Application No. 2016-004989, pp. 1 through 8.

* cited by examiner

FIG.1
(a)
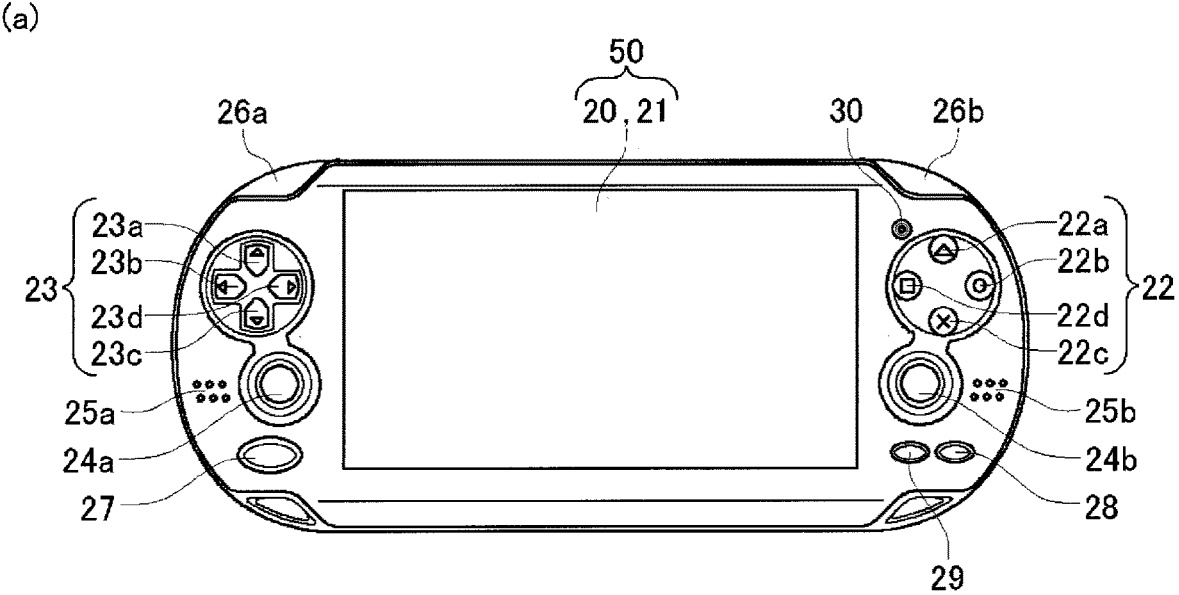
(b)
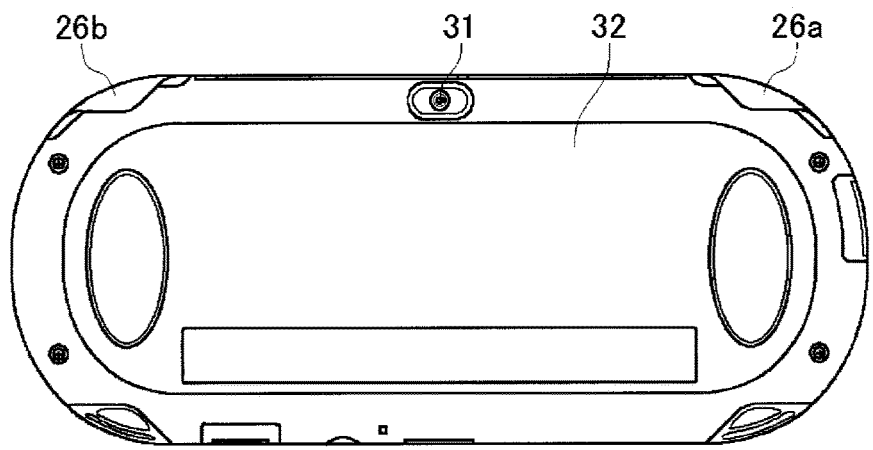

FIG.2
(a)
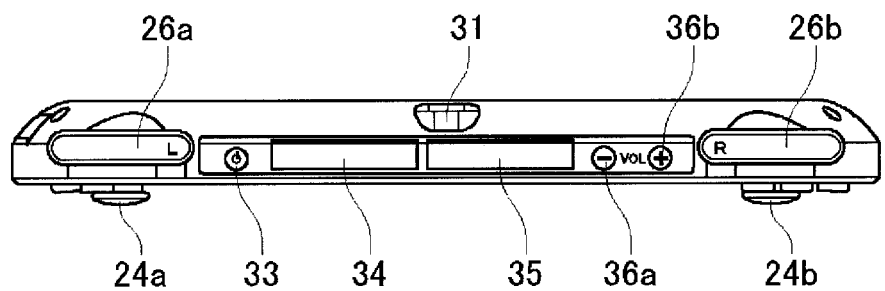
(b)
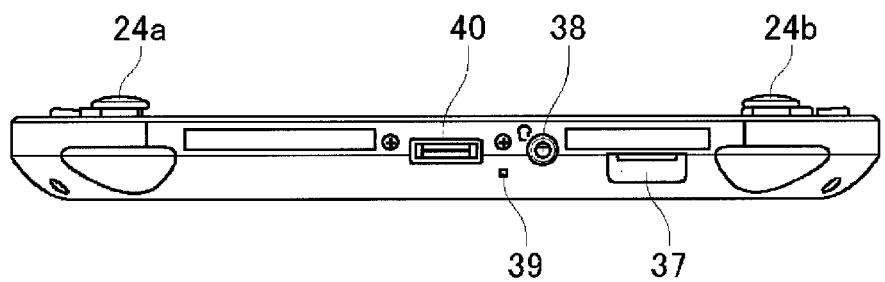
(c)
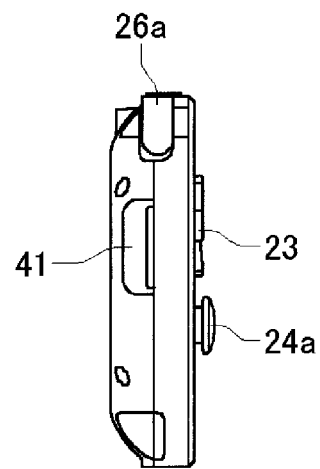

FIG.5
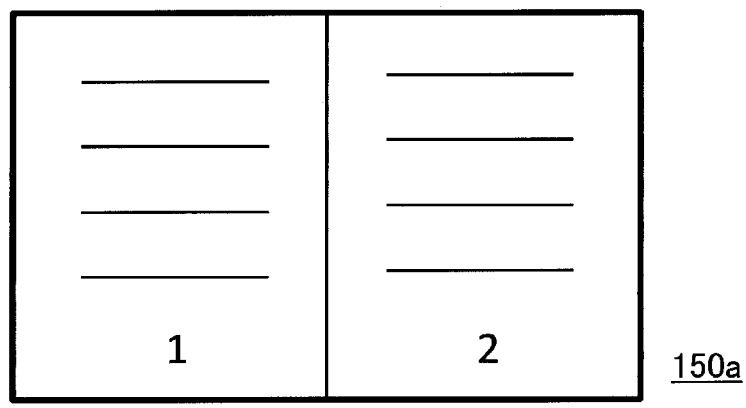
150a
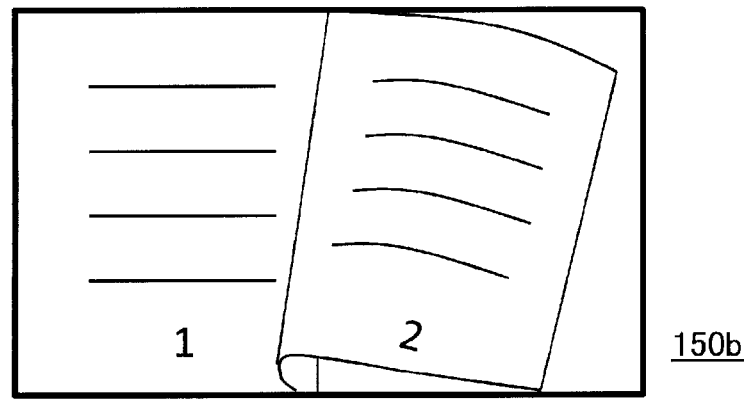
150b
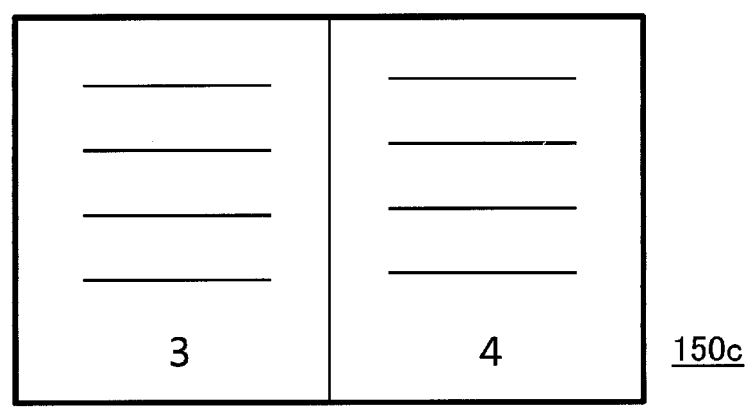
150c

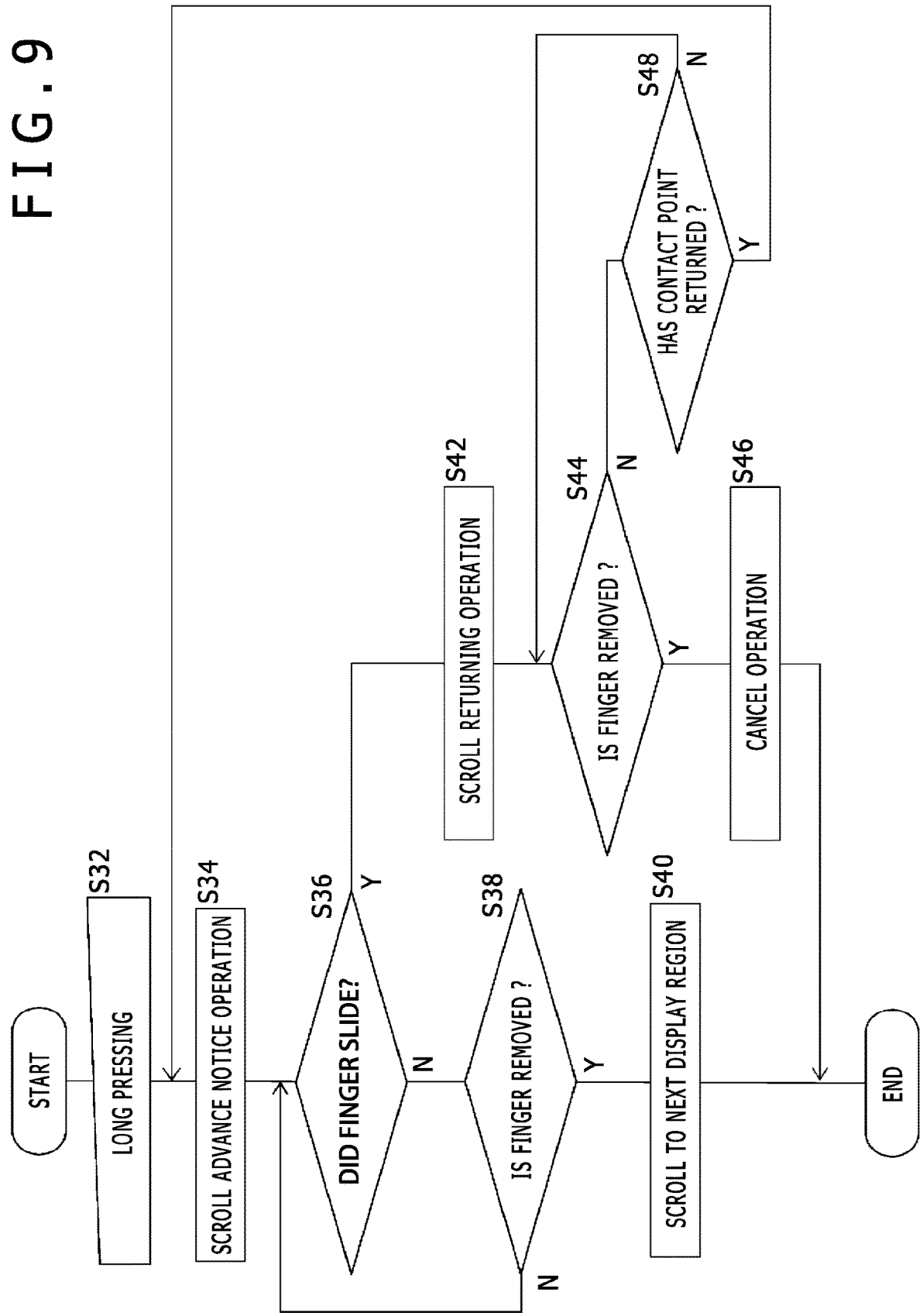

INFORMATION PROCESSING DEVICE AND INFORMATION PROCESSING METHOD FOR MOVING OR ADVANCING A DISPLAY REGION

TECHNICAL FIELD

The present invention relates to an information processing device that performs display screen information processing according to a manual operating input by a user, and an information processing method.

BACKGROUND ART

Information processing devices such as portable type game machines, PDAs (Personal Digital Assistants), and the like have spread. Recently, many information processing devices have been equipped with a communicating function, and multifunctional type information processing devices into which functions of a mobile telephone, a PDA, and the like are integrated into one, such as smart phones, have also appeared. Such an information processing device includes a high-capacity memory and a high-speed processor, so that a user can enjoy various applications by installing application programs (see for example PTL 1).

Because such an environment is provided, various kinds of contents such as electronic books, moving images including video and the like, Web pages, music, and the like are obtained via a network or a recording medium and personally enjoyed on an information processing device on a daily basis. In addition, viewing with high image quality has become possible irrespective of the size of the device such as a personal computer, a portable terminal, or the like. An image processing technology has thus become indispensable in daily life.

CITATION LIST

Patent Literature

[PTL 1]
U.S. Pat. No. 7,558,820

SUMMARY

Technical Problem

In a case of viewing contents including many pieces of character information and image information over a large number of pages as in an electronic book, rules for movement between pages and a viewing direction within a page, for example, are unique. Thus, as compared with a case where a Web page is simply displayed, for example, contrivance is necessary for a display method and an operating method. A technology is desired which makes it possible to view contents with a feeling close to that of actually reading a book and with natural operations even when using an information processing device.

The present invention has been made in view of such problems. It is an object of the present invention to provide a technology that can display contents with excellent operability.

Solution to Problem

A mode of the present invention relates to an information processing device. The information processing device is an information processing device for displaying contents formed by a plurality of pages, the information processing device including: an operation receiving section receiving a paging operation of changing a page being displayed in order of the pages; and an image rendering section updating a display image in the order of the pages according to the paging operation, wherein when the paging operation is a fast-forwarding operation requesting page changes to be made consecutively in predetermined cycles, the image rendering section updates the display image so as to cull a page to be displayed and display an unculled page in a cycle in which to display the culled page.

Another mode of the present invention relates to an information processing device. The information processing device includes: an operation receiving section receiving contact operations by a user on a touch pad on a display for displaying an image; and a scrolling processing section scrolling a screen in a predetermined direction according to an operation of ending contact without moving a contact point to an outside of a predetermined range from the contact point at a time of a start of the contact, among the contact operations, at a point in time that the contact is ended, wherein as an advance notice operation for the scrolling at the point in time that the contact is ended, the scrolling processing section further scrolls the screen in the predetermined direction by a predetermined amount before the contact is ended.

Yet another mode of the present invention relates to an information processing method. The information processing method is an information processing method performed by an information processing device for displaying contents formed by a plurality of pages, the information processing method including: a step of receiving a paging operation of changing a page being displayed on a display in order of the pages; and a step of updating a display image in the order of the pages according to the paging operation, wherein when the paging operation is a fast-forwarding operation requesting page changes to be made consecutively in predetermined cycles, the step of updating the display image updates the display image so as to cull a page to be displayed and display an unculled page in a cycle in which to display the culled page.

Yet another mode of the present invention relates to an information processing method. The information processing method is an information processing method of an information processing device changing a display image according to an operation by a user, the information processing method including: a step of receiving contact operations by a user on a touch pad on a display for displaying an image; and a step of scrolling a screen in a predetermined direction according to an operation of ending contact without moving a contact point to an outside of a predetermined range from the contact point at a time of a start of the contact, among the contact operations, at a point in time that the contact is ended, wherein the scrolling step includes a step of, as an advance notice operation for the scrolling at the point in time that the contact is ended, scrolling the screen in the predetermined direction by a predetermined amount before the contact is ended.

It is to be noted that arbitrary combinations of the above constituent elements as well as modes realized by converting expressions of the present invention between a method, a device, a system, a computer program, a recording medium on which the computer program is recorded, and the like are also effective as modes of the present invention.

Advantageous Effect of Invention

According to the present invention, an information processing technology can be realized which displays contents with excellent operability and excellent accessibility.

BRIEF DESCRIPTION OF DRAWINGS

FIG. 1 (a) is a diagram showing the front of an information processing device in a present embodiment, and (b) is a diagram showing the rear of the information processing device.

FIG. 2 (a) is a diagram showing the top surface of the information processing device in the present embodiment, (b) is a diagram showing the bottom surface of the information processing device, and (c) is a diagram showing the left side surface of the information processing device.

FIG. 5 is a diagram showing an example of an electronic book viewing screen displayed in the present embodiment.

FIG. 9 is a flowchart of a procedure for display region movement processing at a time of a long pressing operation in the present embodiment.

DESCRIPTION OF EMBODIMENTS

Figure 3:
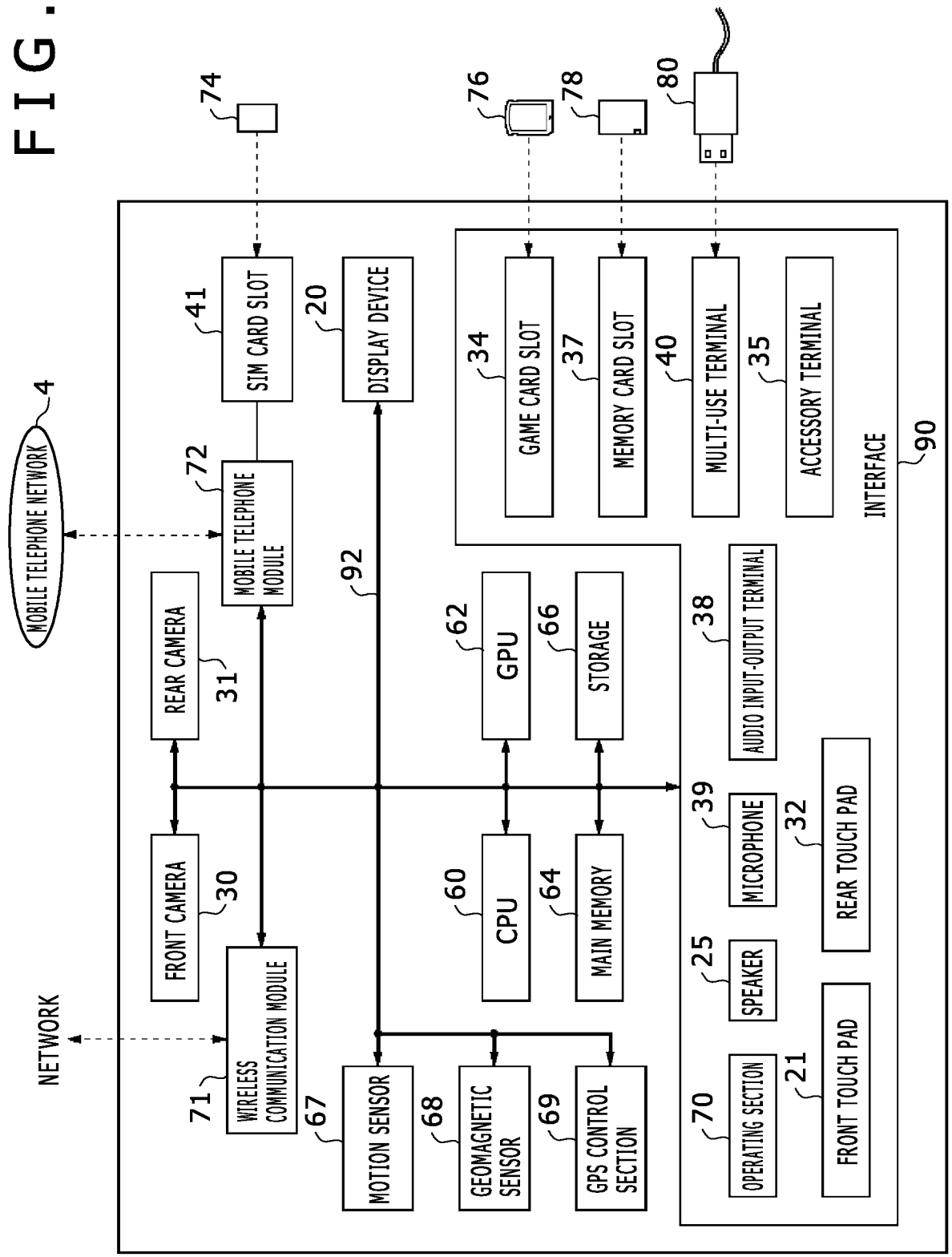
FIG. 3 is a diagram showing a circuit configuration of the information processing device in the present embodiment.

Description will first be made of an example of external constitution and an example of circuit configuration of an information processing device according to a present embodiment. However, the information processing device shown in the following is an example, and may be another kind of electronic apparatus or terminal device.

FIG. 1(a) shows the front of the information processing device 10. The information processing device 10 is formed in a horizontally long housing. The right and left sides of the housing, which are held by a user, have an arc-shaped outer surface. On the front surface of the information processing device 10 is provided a rectangular touch panel 50. The touch panel 50 includes a display device 20 and a front touch pad 21 that is transparent and covers the surface of the display device 20. The display device 20 is an organic Electro-Luminescence (EL) panel, and displays an image. Alternatively, the display device 20 may be display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22a, a circle button 22b, a cross button 22c, and a square button 22d (hereinafter referred to as "control buttons 22" when referred to collectively). The buttons are each located at the vertices of a rhombus. At the left of the touch panel 50 are provided an up key 23a, a left key 23b, a down key 23c, and a right key 23d (hereinafter referred to as "directional keys 23" when referred to collectively). A user can input eight directions (up, down, left, and right directions, and diagonal directions) by manipulating the directional keys 23.

Below the directional keys 23, a left stick 24a is provided, and below the control buttons 22, a right stick 24b is provided. A user tilts the left stick 24a or the right stick 24b (hereinafter referred to as "analogue sticks 24" when referred to collectively) so as to input the direction and the degree of the tilt. On the upper left and upper right of the housing an L button 26a and an R button 26b are provided, respectively. The control buttons 22, the directional keys 23, the analogue sticks 24, the L button 26a, and the R button 26b implement manipulation means for user manipulation.

In the vicinity of the control buttons 22, a front camera 30 is provided. At the left of the left stick 24a and at the right of the right stick 24b, a left speaker 25a and a right speaker 25b (hereinafter referred to as "speakers 25" when referred to collectively) that output sound are provided respectively. Further, below the left stick 24a is provided a HOME button 27 and below the right stick 24b are provided a START button 28 and a SELECT button 29.

FIG. 1(b) shows the rear of the information processing device 10. On the rear surface of the information processing device 10, a rear camera 31 and a rear touch pad 32 are provided. In a similar manner as that of the front touch pad 21, the rear touch pad 32 is configured as a multi-touch pad. Two cameras and two touch pads are mounted on the information processing device 10 at the front and rear surfaces.

FIG. 2(a) shows the top view of the information processing device 10. As described previously, at the left and right edges of the top surface of the information processing device 10 are provided the L button 26a and the R button 26b, respectively. At the right of the L button 26a, a power button 33 is provided. A user turns the power on or off by pressing the power button 33. The information processing device 10 is provided with a power control function that makes a transition to a suspend state if a time period during which no operation is input (non-operation time period) lasts for a predetermined time period. If the information processing device 10 enters the suspend state, a user can return the information processing device 10 from the suspend state to an awake state by pressing the power button 33.

A game card slot 34 is a slot for inserting a game card. FIG. 2(a) shows the game card slot 34 that is covered by a slot cover. In the vicinity of the game card slot 34, an LED lamp may be provided that blinks when a game card is accessed. An accessory terminal 35 is a terminal for connecting a peripheral device (accessory). FIG. 2(a) shows the accessory terminal 35 that is covered by a terminal cover. Between the accessory terminal 35 and the R button 26b are provided a minus button 36a and a plus button 36b for adjusting volume.

FIG. 2(b) shows the bottom view of the information processing device 10. A memory card slot 37 is a slot for inserting a memory card. FIG. 2(b) shows the memory card slot 37 that is covered by a slot cover. On the bottom surface of the information processing device 10 are provided an audio input and output terminal 38, a microphone 39, and a multi-use terminal 40. The multi-use terminal 40 supports Universal Serial Bus (USB), and can be connected to another device via a USB cable.

FIG. 2(c) shows the left side view of the information processing device 10. On the left side face of the information processing device 10 is provided a SIM card slot 41, which is a slot for inserting a SIM card.

FIG. 3 shows the circuit configuration of the information processing device 10. Respective elements thereof are connected to one another via a bus 92. A wireless communication module 71 includes a wireless LAN module that complies with a communication standard such as IEEE802.11b/g or the like. The wireless communication module 71 is connected to an external network such as the Internet or the like via a wireless access point or the like. The wireless communication module 71 may be provided with a Bluetooth (registered trademark) protocol communication function. A mobile phone module 72 supports the 3rd Generation digital mobile phone system that complies with the International Mobile Telecommunication 2000 (IMT-2000) defined by the International Telecommunication Union (ITU). The mobile phone module 72 is connected to a mobile phone network 4. Inserted in the SIM card slot 41 is a SIM card 74, on which a unique ID number for identifying the telephone number of a mobile phone is stored. As a result of the SIM card 74 being inserted in the SIM card slot 41, the mobile phone module 72 can communicate with the mobile phone network 4.

A Central Processing Unit (CPU) 60 executes a program or the like loaded onto a main memory 64. A Graphics Processing Unit (GPU) 62 performs calculations required for image processing. The main memory 64 is configured with Random Access Memory (RAM) or the like, and stores a program and/or data to be used by the CPU 60. A storage 66 is configured with a NAND-type flash memory or the like, and is utilized as a built-in auxiliary storage device.

A motion sensor 67 detects the movement of the information processing device 10, and a geomagnetic sensor 68 detects earth-geomagnetism in each of the three-axis directions. A GPS control section 69 receives signals from the GPS satellites and calculates the current position. The front camera 30 and the rear camera 31 capture an image and input the image data thereof. The front camera 30 and the rear camera 31 are configured with a Complementary Metal Oxide Semiconductor (CMOS) image sensor.

The display device 20 is an organic EL display device, and provided with a light emitting element which emits light when a voltage is applied between a negative electrode and a positive electrode. During power saving mode, by reducing the voltage to be applied between the electrodes to a level below that of a normal mode, the display device 20 can be turned into a low-light state. Thus, the power consumption can be restricted. Alternatively, the display device 20 may be a liquid crystal display device provided with a backlight. During power saving mode, by reducing the light intensity of the backlight, the liquid crystal display device can be turned into a low-light state. Thus, the power consumption can be restricted.

In an interface 90, an operating section 70 includes various manipulation means provided in the information processing device 10. More specifically, the operating section 70 includes the control buttons 22, the directional keys 23, the analogue sticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speakers 25 output sound generated by respective functions of the information processing device 10. The microphone 39 inputs sound from around the information processing device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

The information processing device 10 in the present embodiment not only performs game and communicating functions but also functions as a portable terminal for enjoying various kinds of contents such as electronic books, video, music, and the like. The electronic data of the contents is downloaded from a content providing server via the network, and stored in the storage 66. Alternatively, the electronic data of the contents is stored in the memory card 78 inserted in the memory card slot 37.

The electronic data of the contents is then read according to an output request from the user, and subjected to decoding processing and the like as appropriate. The electronic data of the contents is consequently output from the display device 20 and the speakers 25. In the present embodiment, attention will be directed mainly to methods for operating the display screen using the operating section 70 and the front touch pad 21 at a time of viewing of an electronic book. Description of processing and configurations to which ordinary technologies can be applied, which processing is included in processing for displaying an electronic book selecting screen and an electronic book viewing screen, will be omitted as appropriate.

Figure 4:
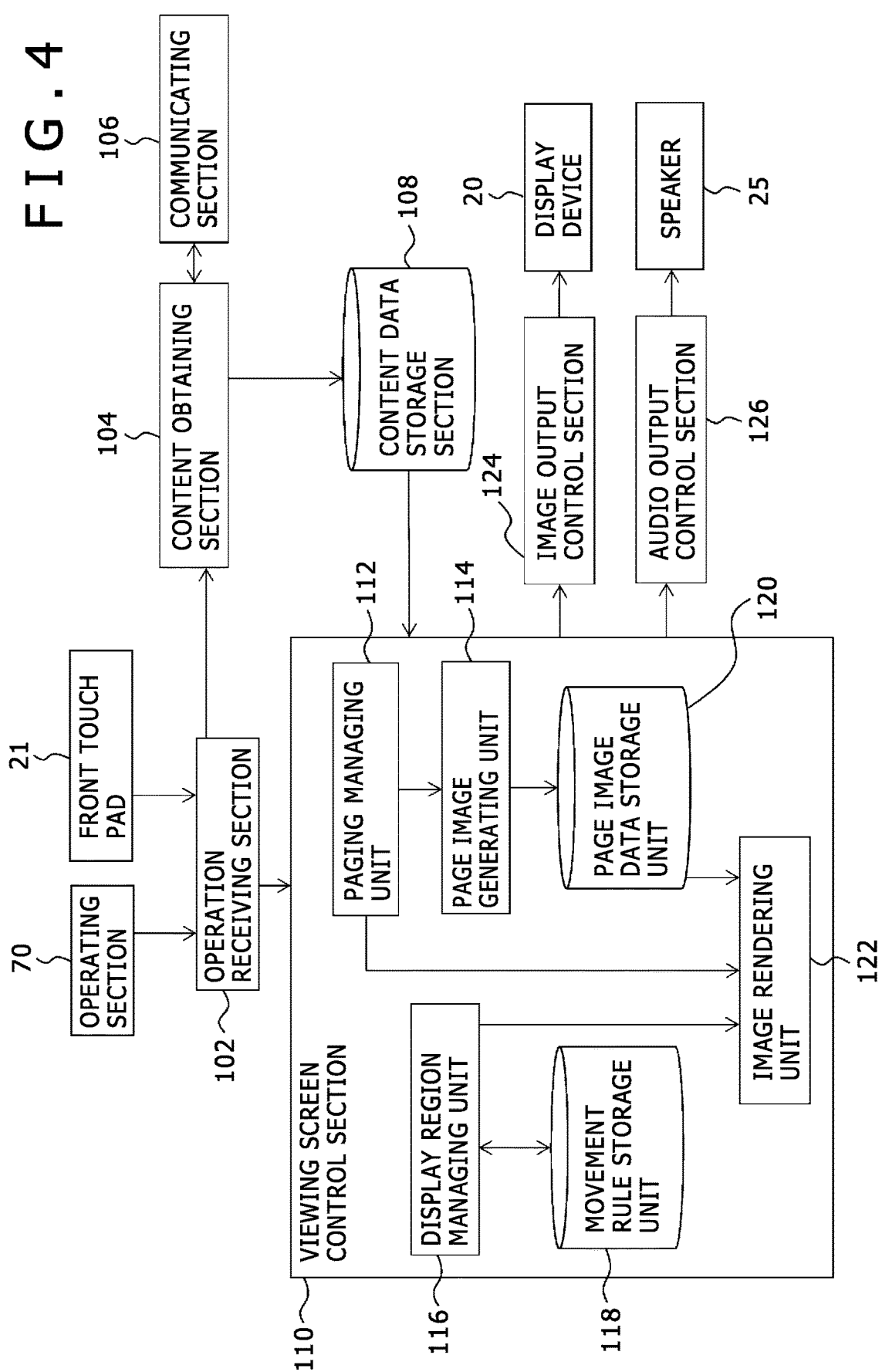
FIG. 4 is a diagram showing functional blocks of the information processing device in the present embodiment.

FIG. 4 shows functional blocks of the information processing device 10. The information processing device 10 includes: an operation receiving section 102 for receiving information related to operating input by the user; a content obtaining section 104 for obtaining the data of contents according to an operation; a communicating section 106 for establishing communication with a server providing the data of the contents or the like; a content data storage section 108 for storing the data of the contents; a viewing screen control section 110 for controlling a screen for viewing the contents; an image output control section 124 for controlling the output of screen data to the display device 20; and an audio output control section 126 for controlling the output of audio data to the speakers 25.

The functional blocks shown in this case are implemented, in terms of hardware components, by the CPU of an arbitrary computer, a memory, a program loaded in the memory, and the like. In this case, however, the functional blocks implemented by cooperation of these components are depicted. Hence, it is to be understood by those skilled in the art that these functional blocks can be implemented in various forms by only hardware, only software, or a combination of hardware and software.

The operation receiving section 102 receives a signal indicating details of an operation performed on the information processing device 10 by the user from operating means such as the operating section 70, the front touch pad 21, or the like described previously. When the operation performed by the user is an operation for requesting the obtainment of the electronic data of new contents, the content obtaining section 104 receives information on the requested contents, a content providing server from which to obtain the contents, and the like from the operation receiving section 102. The electronic data of the contents is then obtained via the communicating section 106. An operating method and a processing procedure for establishment of communication and data transmission that are performed in this case may be similar to those performed at a time of downloading ordinary content data. The obtained data of the contents is stored in the content data storage section 108 in association with identifying information.

The viewing screen control section 110 controls a screen for viewing contents selected by the user from the content data storage section 108, or an electronic book in this case, according to the details of the user operation received by the operation receiving section 102. The viewing screen control section 110 includes: a paging managing unit 112 for determining a page to be displayed; a page image generating unit 114 for generating the page to be displayed as an image; a page image data storage unit 120 for storing the data of the generated image; a display region managing unit 116 for determining a display region in a page being displayed; a movement rule storage unit 118 for storing a rule related to the movement of the display region; and an image rendering unit 122 for rendering an image in the display region.

Generally, the data of contents purchased and downloaded from a content providing server or the like by the information processing device is subjected to a viewing restriction by a technology of digital copyright management, or so-called DRM (Digital Rights Management). The page image generating unit 114 therefore decrypts the data of an electronic book stored in the content data storage section 108 by a predetermined key, and stores the data as image data of each page in the page image data storage unit 120 together with a page number. At a point in time that the user selects the electronic book to be viewed, the page image generating unit 114 basically starts to generate image data from a first page. The page image data storage unit 120 is formed by the main memory 64 or the like. The page image data storage unit 120 sequentially stores the generated image data.

When the user performs a paging operation for advancing a page or returning to a previous page via the operating section 70 or the like, the paging managing unit 112 determines a page to be displayed according to the paging operation. For example, supposing that a page on a side corresponding to the L button 26a or the R button 26b is turned, the paging managing unit 112 identifies the number of the page to be displayed after the page turning according to the operation. However, the operating means is not limited to this. A GUI (Graphical User Interface) may be operated via the front touch pad 21, for example.

When the user performs an operation for moving a region to be displayed in a page being displayed via the operating section 70, the front touch pad 21, or the like, the display region managing unit 116 determines the position and size of the display region according to the operation. The position and size of the display region may be expressed by the coordinates of four corners of the display region in a coordinate system of a page image or the like. For example, supposing that the left stick 24a is used to scroll the screen, and the right stick 24b is used to enlarge/reduce the screen, the display region managing unit 116 sequentially calculates temporal changes in the position and size of the display region on the basis of amounts of tilting and tilting directions of these sticks. Alternatively, according to an operation of sliding a finger touching the front touch pad 21, the screen may be scrolled and displayed in a sliding direction, and the screen may be enlarged or reduced according to an operation of increasing or decreasing an interval between two fingers. Ordinary technologies can be applied to processing according to these operations.

In addition to scrolling processing in an arbitrary direction as described above, the display region managing unit 116 realizes a mode of sequentially displaying a plurality of display regions set in advance within a page. For example, a plurality of divided display regions are formed in advance so as to cover an entire page, and order of display is set in advance. Each time the user performs an advancing operation, scrolling is performed so as to advance a display region to a next display region according to the display order. When the display order is made to correspond to a viewing direction in such a configuration, the user can continue to read while a part of the page remains enlarged. The display regions thus set in advance will hereinafter be referred to as "specified display regions."

The movement rule storage unit 118 stores information related to the position and size of the specified display regions and information related to the display order. Because an appropriate display region and appropriate display order differ depending on the contents of the book and the like, information supplied as additional data of the electronic book may be loaded from the content data storage section 108 into the movement rule storage unit 118. Alternatively, these pieces of information may be prepared in association with the size and category of the book or the like, and selected according to bibliographic information included in the data of the electronic book.

According to a request to display a new page, which request is made from the paging managing unit 112, the image rendering unit 122 reads out the image data of the page from the page image data storage unit 120, and renders a display image. At this time, the image rendering unit 122 expresses a change of pages in a moving image by inserting an animation of turning a page. At this time, a sound effect of turning a page may be output in synchronism with the animation. In addition, according to a request to change a display region, which request is made from the display region managing unit 116, the image rendering unit 122 sequentially renders the image of the display region. The rendered image is sent out to the image output control section 124.

The image output control section 124 performs output control of the display image rendered by the image rendering unit 122 in timing according to the output format of the display device 20. When a sound effect of turning a page is to be output, the image rendering unit 122 makes a request to that effect to the audio output control section 126, whereby the audio output control section 126 outputs a predetermined audio signal to the speakers 25.

As described above, the page image generating unit 114 starts to generate the data of a page image at a point in time that an electronic book to be displayed is selected. However, in a case where the user advances the page forward by fast forwarding immediately after the selection, for example, the page to be displayed may be advanced further than pages already stored in the page image data storage unit 120. The image rendering unit 122 then waits for the page image generating unit 114 to generate the image data to be read out. As a result, page turning may be slowed suddenly during the fast forwarding, for example, which may give the user a feeling of strangeness.

Accordingly, a method is introduced which prevents the speed of the page turning from being changed even in such a case. Specifically, when paging has reached a range where no image data is stored in the page image data storage unit 120, the paging managing unit 112 detects that paging has reached a range where no image data is stored in the page image data storage unit 120, and instructs the page image generating unit 114 to cull pages whose image data is to be generated at predetermined intervals. At this time, the image rendering unit 122 renders a display image so as to display pages whose image data is already generated and which pages precede or succeed the culled pages as a dummy in timing in which to display the culled pages.

As a result, a state occurs in which same pages are displayed a plurality of times before and after the animation of turning a page. However, such a state is not easily recognized visually during fast-forwarding operation. Thus, a frame rate at which to generate image data can be lowered temporarily while the speed of the page turning is maintained. By lowering the frame rate, a reached point of displayable pages can be made to correspond to the number of times of page turning. Therefore an objective of fast forwarding, such as guessing pages desired to be viewed while scanning pages, for example, is not hindered. Incidentally, the page image generating unit 114 prepares for subsequent display by also generating the image data of the culled pages in any timing in which there is a processing time to spare.

FIG. 5 shows an example of an electronic book viewing screen displayed in the present embodiment. In the example of the figure, a double-page spread of a book is displayed on one screen. A screen 150*a* displays a first page and a second page simultaneously. When the user performs an operation of turning a page on a right side (second page) by for example depressing the R button 26*b* in this state, the image rendering unit 122 obtains information to that effect from the paging managing unit 112. Then, as shown on a screen 150*b*, a moving image of turning the page on the right side is inserted, and as shown on a screen 150*c*, a third page and a fourth page after the page turning are rendered.

When the L button 26*a* is depressed, display is made in a similar manner such that the page on a left side is turned. When the L button 26*a* or the R button 26*b* has continued to be pressed for a predetermined time or more, a change from the screen 150*a* to the screen 150*c*, that is, page turning display is made at high speed at a predetermined rate as page fast-forwarding operation. However, the operating means is not intended to be limited to this. In addition, the speed of the page turning may be changed in multiple steps according to the duration of the depression. As described above, when display has advanced to a page whose image data is not generated, a state is produced in which pages displayed before and after page turning are not changed while a moving image of turning a page is inserted as shown on the screen 150*b*.

Figure 6:
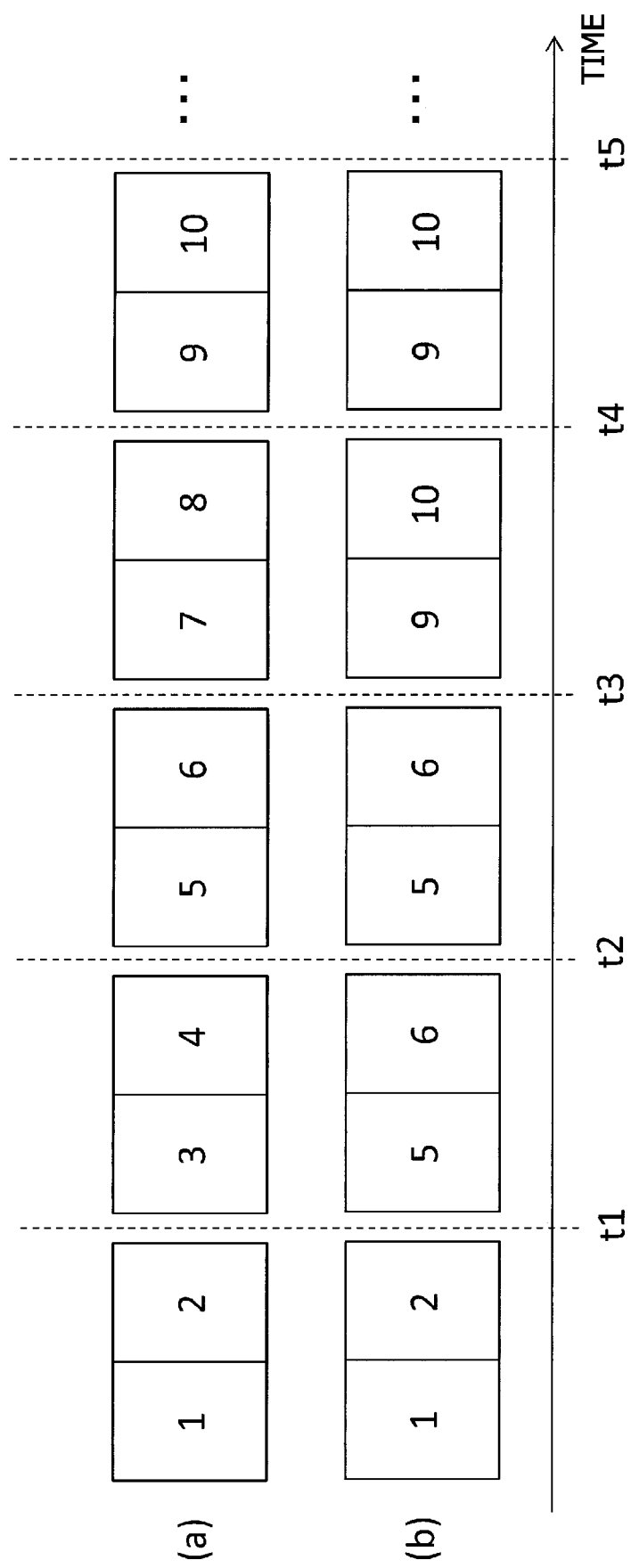
FIG. 6 is a diagram showing an example of changes in a screen at a time of a fast-forwarding operation in the present embodiment.

FIG. 6 shows an example of changes in the screen at a time of a fast-forwarding operation. In a mode (a), changes in the screen displayed before and after page turning are shown so as to correspond to the passage of time when image data to be generated is not culled. In a mode (b), changes in the screen displayed before and after page turning are shown so as to correspond to the passage of time when every other piece of image data to be generated is culled. Each rectangle represents the screen of a double-page spread displayed in each cycle of page turning at time t1, t2, t3, t4, t5, . . . . A left number and a right number within a rectangle correspond to pages of a book.

In the mode (a), all pages, that is, pages 1/2, pages 3/4, pages 5/6, pages 7/8, pages 9/10, . . . , are sequentially displayed in respective time steps as cycles of page turning. This state is similar to a state in which fast forwarding is not performed. On the other hand, in the mode (b), image data to be generated is culled in every other image including double-page spread pages, that is, pages 3/4, pages 7/8, . . . . Therefore, in a period from time t1 to time t2 in which to display the original pages 3/4, pages 5/6 as a next image are displayed as a dummy. Similarly, in a period from time t3 to time t4 in which to display the original pages 7/8, pages 9/10 as a next image are displayed as a dummy. As a result, pages 5/6 and pages 9/10 are displayed consecutively in two time steps.

This also makes it possible to display the same images as in the mode (a) in every other time step as in periods from time t2 to time t3 and from time t4 to time t5, for example. Therefore the display image can be made to appear to catch up with the timing of page turning. Incidentally, FIG. 6 shows an example in which every other piece of image data to be generated is culled. However, the ratio of culled images is adjusted as appropriate according to the processing power of the information processing device, the speed of page turning which speed is desired at the time of the fast-forwarding operation, and the like. For example, a plurality of images may be culled consecutively. In addition, images to be displayed as a dummy may be images of pages preceding the culled images, or may be page images for use as a dummy prepared separately. When consecutive images are culled, images to be displayed as a dummy in a period in which to display the consecutive images may be changed during the period.

Figure 7:
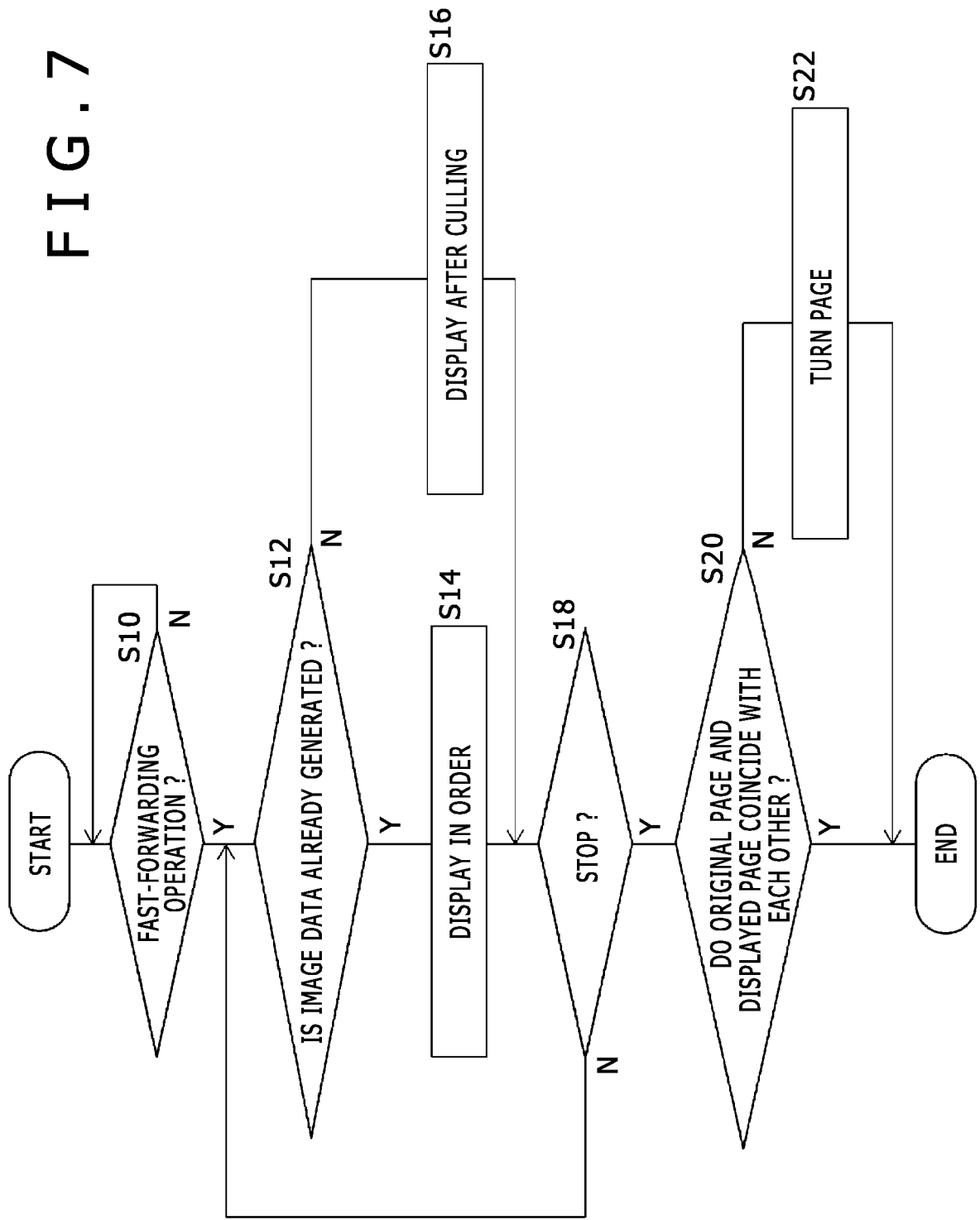
FIG. 7 is a flowchart of a processing procedure at a time of a fast-forwarding operation in the present embodiment.

FIG. 7 is a flowchart mainly showing a processing procedure at a time of a fast-forwarding operation, among paging display processing procedures performed by the paging managing unit 112 and the image rendering unit 122. This flowchart is started in a state in which a viewing screen showing a page of an electronic book selected by the user is displayed. First, the paging managing unit 112 monitors whether or not a fast-forwarding operation is performed by the user (S10). While the fast-forwarding operation is not performed, the monitoring is continued while pages being displayed, pages preceding or succeeding the pages being displayed, and the like are displayed according to operation of the user (N in S10).

When the fast-forwarding operation is performed (Y in S10), and pages to be displayed according to the fast-forwarding operation are within a range of pages already stored in the page image data storage unit 120 (Y in S12), the image rendering unit 122 renders images in order as in the mode (a) in FIG. 7. Thus, fast forwarding is performed without any pages being omitted (S14). On the other hand, when the pages have advanced to a range of pages not stored in the page image data storage unit 120 (N in S12), display is changed while image data to be generated is culled as in the mode (b) in FIG. 7 (S16). Until the fast-forwarding operation is stopped, the processing of S14 or S16 is continued according to the determination in S12 (N in S18).

When the user stops the fast-forwarding operation (Y in S18), the paging managing unit 112 checks whether or not original pages to be displayed at the point in time coincide with pages being displayed (S20). The original pages to be displayed in this case are pages that should be displayed when pages are displayed without being omitted. In the example of FIG. 6, in the time step from time t3 to time t4, while the original pages 7/8 should be displayed, pages 9/10 are displayed when images are culled.

When the fast-forwarding operation is stopped in such timing, the image rendering unit 122 determines that the original pages to be displayed do not coincide with the pages being displayed, and stops the screen after inserting a moving image of turning a page once (N in S20 and S22). When the original pages to be displayed coincide with the pages being displayed in S20, the screen is stopped as it is (Y in S20). Thus, correspondence between the number of times of page turning managed by the image rendering unit 122 and actual display pages becomes the same regardless of whether or not pages are displayed without being omitted. Therefore, subsequent processing can be unified, and management can be performed easily. A similar effect can be obtained when the dummy page images being displayed are rewritten with the images of the original pages to be displayed, in place of the processing of S22.

Figure 8:
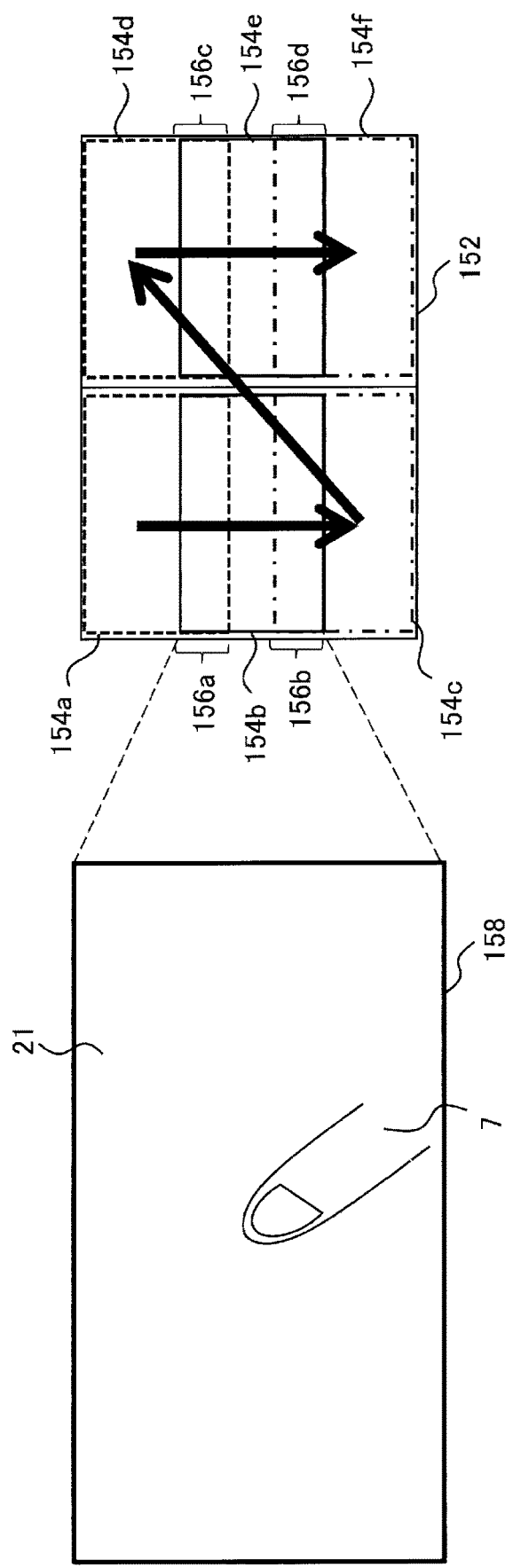
FIG. 8 is a diagram of assistance in explaining processing of movement of display to a specified display region in the present embodiment.

FIG. 8 is a diagram of assistance in explaining processing of movement of display to a specified display region. As shown on a right side of the figure, a plurality of specified display regions 154a, 154b, 154c, 154d, 154e, and 154f are set in advance for the image of pages to be displayed such as spread pages 152 or the like. Then, as described above, the specified display regions are sequentially displayed in fixed order according to a predetermined advancing operation. For example, according to an advancing operation performed during the display of the specified display region 154a, the screen is scrolled to the specified display region 154b. When an operation for advancing further is performed, scrolling is performed to the specified display region 154c.

As a result, an image of an enlarged part of the page is displayed on the screen, and the display position of the image moves stepwise within the page. Thereby a mode can be realized in which scrolling is performed automatically in an optimum direction for continuing to read while the enlarged state is maintained even though a bird's-eye view of the entire page is not presented. In the case of the figure, as indicated by arrows within the spread pages 152, display is moved in order of the specified display regions 154a, 154b, 154c, 154d, 154e, and 154f, that is, in such a manner as to be advanced from the top to the bottom of the left page and thereafter advanced from the top to the bottom of the right page. A rule related to such display order is stored in the movement rule storage unit 118 together with information on each of the specified display regions.

The display order is basically a direction of continuing to read the book. Hence, the rule differs depending on whether the book is opened to the left or opened to the right and whether the book is written vertically or written horizontally. Similarly, the size of one specified display region may be determined as appropriate according to the type of the book and the like. In addition, as shown in the figure, overlap regions 156a, 156b, 156c, and 156d are preferably provided between specified display regions adjacent to each other. Thus, even when display is advanced to a next region, a part of a region displayed previously remains. Therefore, text or the like is not broken, and relation before and after the movement is easy to understand. Particularly in a case of a book that continues to be read in region units such as frames or balloons of a cartoon, for example, it is possible to prevent the occurrence of a problem of inadvertently dividing a region and making the region difficult to read.

A drawing on the left side of FIG. 8 shows such an operation of advancing in the specified display regions. The specified display region 154b, for example, is displayed on a screen 158 represented by a rectangle in this case. When a tap operation is performed on the front touch pad 21 by a finger 7 in this state, display is advanced to the next specified display region 154c. Specifically, when the contact of the finger 7 with the front touch pad 21 is ended within a predetermined time in a state of remaining within a predetermined range from a contact point at a time of a start of the contact, the operation receiving section 102 determines that a tap operation has been performed. The display region managing unit 116 then requests the image rendering unit 122 to scroll to the next specified display region 154c. A mode is thereby realized in which scrolling is started at a point in time that the finger 7 is removed from the front touch pad 21 and the scrolling is stopped at a point in time that the next specified display region 154c is displayed. Incidentally, the contact with the front touch pad 21 is not limited to the finger 7, but may be made by a stylus or the like. The same is true for operations to be described later.

When the tap operation on the front touch pad 21 is thus used, the tap operation on the front touch pad 21 and a free scrolling operation that makes the display image move so as to follow a contact point by a drag operation can be used properly according to conditions. Here, it is determined that the drag operation is performed when the contact of the finger 7 is moved within a predetermined time to the outside of the predetermined range from a contact point at a time of a start of the contact. Incidentally, screen scrolling by a tap operation is not limited to scrolling for moving to a next specified display region. For example, scrolling may be performed to move the display region in a predetermined direction by a predetermined number of pixels, or scrolling may be performed to move in a predetermined direction by a predetermined percentage of a region being displayed when the tap operation is performed. In either case, an amount of scrolling and a scrolling direction are stored in the movement rule storage unit 118.

Further, the scrolling direction may be changed according to a position where the tap operation is performed on the front touch pad 21. For example, when a tap operation is performed within a predetermined region in an upper part of the front touch pad 21, scrolling is performed in an upward direction by a predetermined amount. Similarly, when a tap operation is performed within a predetermined region in a lower part, within a predetermined region on a left side, or within a predetermined region on a right side, scrolling may be performed in a downward direction, a left direction, or a right direction, respectively, by a predetermined amount. Two or more of these directions may be combined with each other, or scrolling may be performed in only one of the directions. When a tap operation is performed at an upper edge of the page image to scroll further in the upward direction, display may be changed to a previous page image. Similarly, when a tap operation is performed at an edge of the page image to scroll further to the outside of the page, display may be changed to another page image according to a rule set in advance.

In addition, the amount of scrolling may be changed stepwise according to the position where the tap operation is performed within the above-described "predetermined region." For example, when a tap operation is performed within an upper half region "within a predetermined region in an upper part," the amount of scrolling in the upward direction is made larger than when a tap operation is performed within a lower half region. These rules are also stored in the movement rule storage unit 118. The display region managing unit 116 determines the scrolling direction and the amount of scrolling on the basis of the position where the tap operation is performed.

A long pressing operation is further provided as operating means for moving the display region by a predetermined amount such as scrolling for moving between specified display regions as described above or the like. It is determined that the long pressing operation has been performed at a point in time that a state in which the contact of the finger 7 with the front touch pad 21 remains within the predetermined range from a contact point at a time of a start of the contact has been continued for a predetermined time. At this point in time, that is, in a state of the finger 7 touching the front touch pad 21, a scrolling advance notice operation is added first. When the finger 7 is thereafter removed from the front touch pad 21, scrolling is performed in a predetermined direction by a predetermined amount as in the tap operation.

At a point in time that it is determined that long pressing has been performed during the display of the specified display region 154b, for example, advance notice of a scrolling direction when the finger is removed is given by moving the display region by a minute amount to the lower side where the specified display region 154c to be displayed next is present. This makes it easy for the user to recognize that the action of touching with the finger is a preparation for a display region moving operation, and makes it possible to give a sense of security as compared with a case where no reaction occurs. In addition, the user can be informed in advance of the direction in which the display region will move when the touched finger is removed.

Incidentally, the amount of scrolling at the time of the advance notice operation may be smaller than the original amount of scrolling when the finger is removed, or may be the same as the original amount of scrolling when the finger is removed. The amount of scrolling may be determined by a rule different from that for the time when the finger is removed. For example, the amount of scrolling may be a predetermined number of pixels, a predetermined percentage of a region being displayed, or the like. In addition, as an advance notice operation, after scrolling is performed once, scrolling may be performed in an opposite direction to return the display region to the original position. The operation at the time of the long pressing operation is performed by adding the advance notice operation to the operation at the time of the above-described tap operation, and can therefore be considered to give the user an opportunity for judgment in response to the advance notice operation. Hence, variations of scrolling when the finger is removed may be similar to those described above in relation to the tap operation. When advance notice of scrolling in the direction of the outside from an edge of a page is given, display may be changed to another page image as in actual scrolling, or a margin region outside the page may be displayed by a predetermined amount. Alternatively, scrolling may not be performed as advance notice.

FIG. 9 is a flowchart of a procedure for display region movement processing at a time of a long pressing operation by the display region managing unit 116 and the image rendering unit 122. This flowchart is started in a state in which a viewing screen showing a page of an electronic book selected by the user or a part of the page is displayed. When the user performs a long pressing operation in that state (S32), the display region managing unit 116 derives a scrolling direction to a specified display region to be displayed next on the basis of information stored in the movement rule storage unit 118, and performs a scrolling advance notice operation (S34). When the entire page is displayed at this point in time, a specified display region to be displayed first in the page is set as the "specified display region to be displayed next." In addition, when the page is displayed in an enlarged state irrespective of the specified display regions, a specified display region in the closest vicinity of the display may be set as the "specified display region to be displayed next."

Alternatively, the operation of first moving to one of the specified display regions may be made independent of the processing procedure shown in the flowchart, and performed by another operating means. Such a rule is also stored in the movement rule storage unit 118. As described above, the advance notice operation in S34 is an operation of scrolling by a predetermined amount in a direction in which to perform scrolling when the finger is directly removed, such as a direction of a next specified display region or the like. Then, when the user removes the finger brought into contact in S32 without sliding the finger to the outside of the predetermined range (N in S36 and N in S38), the image rendering unit 122 performs scrolling by rendering a display image so as to move display to the next specified display region or the like according to a notification from the display region managing unit 116 (S40).

When the finger is stopped in a state of remaining in contact within the predetermined range, the processing waits as it is (N in S36 and N in S38). When the user slides the finger brought into contact in S32 to the outside of the predetermined range (Y in S36), on the other hand, scrolling performed by the advance notice operation in S34 is returned to the original state (S42). Then, when the user directly removes the finger (Y in S44), it is recognized that the scrolling by the long pressing operation is cancelled, and the processing is ended (S46). Thus, when the scrolling notified in advance is a movement in an undesired direction, the user can cancel the scrolling by directly sliding the finger.

When the contact point has returned to the original contact point or the inside of the predetermined range including the original contact point and vicinities thereof within a predetermined time without the user removing the finger (Y in S48) after the scrolling is returned to the original state in S42, it is recognized that the initial long pressing operation is continued, and the scrolling advance notice operation is performed again (S34). During a period during which the contact point is not returned to the original contact point and the finger is not removed either, the processing waits until the contact point is returned to the original contact point or the finger is removed (N in S44 and N in S48). Incidentally, when the finger is slid in S36, a transition may be made to a free scrolling operation that makes the page image to move so as to follow the movement of the contact point.

According to the present embodiment described above, in a case where a page to be displayed according to a fast-forwarding operation is beyond a range of pages whose image data is already generated when contents including the data of a plurality of pages of an electronic book or the like are displayed, pages whose image data is to be generated are culled by a predetermined rule indicating that every other image is to be culled, for example. Then, adjacent pages whose image data has already been generated are displayed as a dummy in place of the culled pages. Thus, fast forwarding display can be made while an apparent difference as to whether or not image data is generated in time, including an apparent difference in the volume of the pages, is hardly perceived. In addition, a reached point of displayable pages can be made to be substantially the same as in the case where the image data has been generated from the beginning. Therefore a desire of the user to fast-forward to a desired page can be satisfied sufficiently.

In addition, a configuration is provided which sequentially displays display regions specified in advance in a page being displayed according to an advancing operation of the user. Therefore, even when a display image is in an enlarged state, display can be moved to an appropriate region without a present position or a display region to which to advance next being lost track of. A touch panel is used for the advancing operation at this time. Scrolling is performed to a next specified display region at a point in time that a finger is removed from the touch panel after touching the touch panel. At this point in time that it is determined that a long pressing operation has been performed, an advance notice operation is added, the advance notice operation being a movement by a predetermined amount in a direction in which scrolling is intended to be performed. This enables the user to recognize that the advancement of the specified display region will be performed, and enables the user to be informed of a scrolling direction in advance. On the basis thereof, whether to perform the scrolling or whether to cancel the scrolling can be determined at that point in time.

The present invention has been described above on the basis of embodiments thereof. The foregoing embodiments are illustrative, and it is to be understood by those skilled in the art that combinations of constituent elements and processing processes of the embodiments are susceptible of various modifications and that such modifications also fall within the scope of the present invention.

REFERENCE SINGS LIST

10 Information processing device, 20 Display device, 21 Front touch pad, 70 Operating section, 102 Operation receiving section, 104 Content obtaining section, 108 Content data storage section, 110 Viewing screen control section, 112 Paging managing unit, 114 Page image generating unit, 116 Display region managing unit, 118 Movement rule storage unit, 120 Page image data storage unit, 122 Image rendering unit, 124 Image output control section, 126 Audio output control section.

INDUSTRIAL APPLICABILITY

As described above, the present invention is applicable to information processing devices such as computers, information display terminals, game machines, portable terminals, and the like.

The invention claimed is:

1. An information processing device for displaying contents formed by a plurality of pages, the information processing device comprising:
a processor;
a display fully displaying two consecutive pages from the plurality of pages;
an operation receiving circuit receiving, using the processor a paging operation of changing the two consecutive pages; and
an image rendering circuit updating a display image according to the paging operation to display a second two consecutive pages,
wherein, when the paging operation is a fast-forwarding operation, the image rendering circuit culls pages prior to the paging operation and fully displays an unculled page along with a culled page during the fast-forwarding operation,
wherein the fast-forwarding operation comprises an animation sequentially displaying pairs of pages in predetermined time steps as cycles of page turning, and during the animation, a same set of pairs of pages is displayed in a first cycle of page turning and a second cycle of page turning.

2. The information processing device according to claim 1,
wherein, during the animation, at least one set of non-contiguous pages are displayed concurrently.

3. An information processing device comprising:
an operation receiving circuit receiving contact operations by a user on a touch pad on a display for displaying an image; and
a display region managing circuit scrolling a screen in a predetermined direction when a contact operation is received at a single point within a predetermined area of the display for less than a predetermined period of time,
wherein, if contact is maintained within the predetermined area for more than the predetermined period of time, a) an advance notice operation is displayed and b) after the contact is released after the predetermined period of time, the screen is scrolled in the predetermined direction greater than a predetermined amount,
wherein the advance notice operation is a temporary scrolling in the predetermined direction by the predetermined amount.

4. The information processing device according to claim 3,
wherein when the contact is ended in a state in in which the contact point has been moved to the outside of the predetermined range after the start of the contact, the display region managing circuit does not scroll the screen.

5. The information processing device according to claim 3, further comprising a movement rule storage circuit storing movement rule information related to a plurality of display regions specified for the image as a display object and order of display of the plurality of display regions,
wherein the display region managing circuit scrolls the screen to a display region to be displayed next, the display region to be displayed next being specified in the movement rule information, at the point in time that the contact is ended.

6. An information processing method performed by an information processing device for displaying contents formed by a plurality of pages, the information processing method comprising:
displaying two consecutive pages from the plurality of pages;
culling a plurality of pages occurring after the two consecutive pages;
receiving a paging operation for changing the two consecutive pages; and
displaying a fast-forwarding animation sequentially displaying pairs of pa es in predetermined time steps as cycles of page turning,
wherein the fast-forwarding animation displays a same set of pairs of pages in a first cycle of page turning and a second cycle of page turning;
updating a display image to a second set two consecutive pages.

7. An information processing method of an information processing device changing a display image according to an operation by a user, the information processing method comprising:
receiving contact operations by a user on a touch pad on a display for displaying an image; and scrolling a screen in a predetermined direction when a contact operation is received at a single point within a predetermined area of the display for less than a predetermined period of time, wherein, if contact is maintained within the predetermined area for more than the predetermined period of time, a) an advance notice operation is displayed and b) after the contact is released after the predetermined period of time, the screen is scrolled in the predetermined direction greater than a predetermined amount, wherein the advance notice operation is a temporary scrolling in the predetermined direction by the predetermined amount.

8. A non-transitory computer readable recording medium storing a program for a computer that displays contents formed by a plurality of pages on a display, the program comprising:

displaying two consecutive pages from the plurality of pages;

culling a plurality of pages occurring after the two consecutive pages;

receiving a paging operation for changing the two consecutive pages; and displaying a fast-forwarding animation sequentially displaying pairs of pages in predetermined time steps as cycles of pa e turning, wherein the fast-forwarding animation displays a same set of pairs of pages in a first cycle of page turning and a second cycle of page turning in which a) a culled page and an unculled page are displayed concurrently and in which b) a same set of two consecutive pages from the plurality of pages are displayed at least twice;

updating a display image to a second set two consecutive pages.

9. A non-transitory computer readable recording medium storing a program for a computer, the program comprising:

receiving contact operations by a user on a touch pad on a display for displaying an image; and scrolling a screen in a predetermined direction when a contact operation is received at a single point within a predetermined area of the display for less than a predetermined period of time, wherein, if contact is maintained within the predetermined area for more than the predetermined period of time, a) an advance notice operation is displayed and b) after the contact is released after the predetermined period of time, the screen is scrolled in the predetermined direction greater than a predetermined amount, wherein the advance notice operation is a temporary scrolling in the predetermined direction by the predetermined amount.

* * * * *